United States Patent
Herman

(10) Patent No.: US 7,849,365 B2
(45) Date of Patent: Dec. 7, 2010

(54) METHOD FOR REDUCING HOST DEVICE TO ELECTRONIC DEVICE COMMUNICATION ERRORS

(75) Inventor: Kenneth Herman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 306 days.

(21) Appl. No.: 12/183,009

(22) Filed: Jul. 30, 2008

(65) Prior Publication Data

US 2010/0031085 A1 Feb. 4, 2010

(51) Int. Cl.
*G06F 11/00* (2006.01)
(52) U.S. Cl. .......................... 714/42; 714/5
(58) Field of Classification Search .......... 714/5, 714/42

See application file for complete search history.

(56) References Cited

U.S. PATENT DOCUMENTS

| | | | | |
|---|---|---|---|---|
| 5,539,879 | A * | 7/1996 | Pearce et al. | 714/47 |
| 7,526,622 | B1 * | 4/2009 | Bonwick et al. | 711/162 |
| 7,716,519 | B2 * | 5/2010 | Moore et al. | 714/6 |
| 2001/0007120 | A1 * | 7/2001 | Makita | 711/112 |
| 2003/0041284 | A1 * | 2/2003 | Mambakkam et al. | 714/15 |
| 2004/0088608 | A1 * | 5/2004 | Nguyen et al. | 714/49 |
| 2005/0246612 | A1 * | 11/2005 | Leis et al. | 714/763 |
| 2007/0136230 | A1 * | 6/2007 | Kwon | 707/1 |
| 2007/0168714 | A1 * | 7/2007 | Fitzgerald | 714/13 |
| 2009/0180209 | A1 * | 7/2009 | Maeda et al. | 360/48 |
| 2009/0182919 | A1 * | 7/2009 | Chang et al. | 710/106 |

* cited by examiner

*Primary Examiner*—Bryce P Bonzo
(74) *Attorney, Agent, or Firm*—Kramer Levin Naftalis & Frankel LLP

(57) ABSTRACT

This invention is directed to allowing an electronic device with a failed file system to dynamically direct a host device to reformat it, by making the storage component appear to be in its unformatted state. Upon detection of file system failure, the device writes changes to its disk to make it appear as factory-new to a host device. The host device treats the electronic device as if it is a brand new device that has never been connected to a host device before, and reformats it. By reformatting the device's storage component, the host device thereby provides a way to maintain communication between the host device and electronic device, allowing a more sophisticated application to then diagnose and recover the contents of the storage component, without the involvement of the user or a specialist. This avoids returns of devices with failed file systems, thereby improving the overall user experience.

18 Claims, 3 Drawing Sheets

METHOD FOR REDUCING HOST DEVICE TO ELECTRONIC DEVICE COMMUNICATION ERRORS

BACKGROUND OF THE INVENTION

This invention is directed to systems and methods for returning a failed file system of an electronic device to an operative state in response to the electronic device itself determining that its file system has become non-operational.

When an electronic device is operable, an application running on the host device can access the device and perform various functions. When the electronic device has some corruption of its content, but a substantially operational file system, a host device may still be able to communicate with the electronic device. The host device may then perform diagnostics and restore content that may have been lost.

To restore content to a device, however, the host device must be able to first make an operative connection with the device. If the electronic device suffers from a file system failure, for example corruption of a root block, no connection may be made. A user may then be required to return the device to a retailer or manufacturer for servicing.

Such situations may be costly for users, retailers, and manufacturers. Users do not want to make additional trips to a store to meet with a technical specialist. It may also be expensive for the retailer to have technical specialists on hand to resolve such storage component issues. It may be expensive for the manufacturer to have repair entities spend time reinitializing devices. There is a need, therefore, to enable users to force the electronic device to communicate with the host device despite a file system failure.

SUMMARY OF THE INVENTION

Systems and methods for reformatting and restoring electronic devices with failed file systems are provided.

In some embodiments, an electronic device may determine that its file system has failed. It may determine such failure using any suitable approach, such as determining that it failed to mount the file system.

In response to determining that the file system has failed, an electronic device may dynamically instruct a host device that the device's storage component requires formatting. For example, the electronic device may set a root block to a zero value. As another example, the electronic device may spoof the value of a root block detected by the host device. This may have the effect of making the storage component of the electronic device appear to be unformatted, prompting the host device to reformat the storage component.

BRIEF DESCRIPTION OF THE DRAWINGS

The above and other features of the present invention, its nature, and various advantages will be more apparent upon consideration of the following detailed description, taken in conjunction with the accompanying drawings in which.

DETAILED DESCRIPTION

Figure 1:
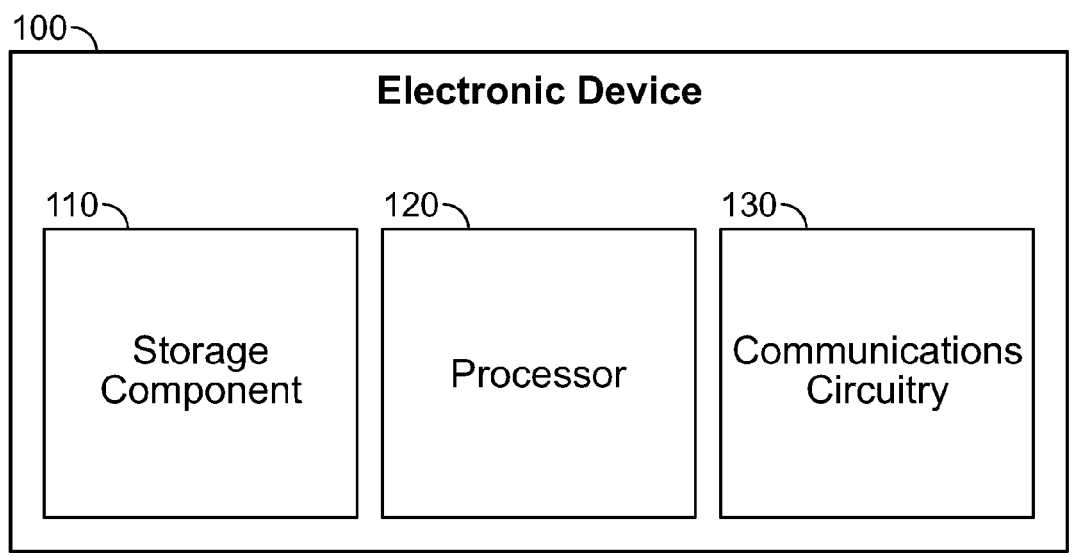
FIG. 1 is a simplified block diagram of a electronic device in accordance with one embodiment of the invention.

FIG. 1 is a simplified block diagram of an electronic device in accordance with one embodiment of the invention. Electronic device 100 may include storage component 110, processor 120 and communications circuitry 130. In some embodiments, electronic device 100 may include several processors, storage media, and communications circuitries. To avoid overcomplicating the drawing, however, only one of each is shown.

The electronic device may include any suitable device, including for example, a desktop computer, laptop computer, device capable of communicating wirelessly (with or without the aid of a wireless enabling accessory system) or via wired pathways (e.g., using traditional electrical wires) with a network, a pocket-sized personal computer, a personal digital assistant ("PDA"), a personal e-mail or messaging device with audio and/or video capabilities (e.g., a Blackberry® or a Sidekick®), an iPod™ touch or an iphone available by Apple Inc. of Cupertino, Calif., or any other suitable electronic device. In some embodiments, electronic device 100 may be sized so as to be relatively portable.

Storage component 110 may include one or more different types of storage, either volatile or non-volatile, including such forms as read only memory (ROM), random access memory (RAM), firmware, erasable programmable read-only memory (EPROM), electrically erasable programmable read-only memory (EEPROM), firmware, solid-state drive (SSD), cache, magnetic media, any other forms of storage components, or a combination thereof. Storage component 110 may be used to store applications (e.g., operating system, user interface functions, and processor functions), media (e.g., music and video files), preference information (e.g., media playback preferences), transaction information (e.g., information such as credit card information), wireless connection information (e.g., information that may enable the device to establish a wireless connection such as a telephone connection), subscription information (e.g., information that keeps track of podcasts, television shows, or other media a user subscribes to), telephone information (e.g., telephone numbers), and any other suitable data.

Processor 120 can be configured to perform any suitable electronic device function. Processor 120 may be used to run operating system applications, firmware applications, media playback applications, media editing applications, or any other application. In some embodiments, processor 120 may be operative to mount a file system in storage component 110. While processor 120 is shown as a single block in FIG. 1, persons skilled in the art will appreciate that the actual implementation of processor 120 can be one or more processors. For example, in the instance where device 100 is a cell phone such as the iPhone™, processor 120 can represent multiple processors, one of which can be used to process cellular phone calls and one which processes more traditional computer applications, such as Internet browsing.

In some embodiments, electronic device 100 may include communications circuitry 130 providing one or more communications interfaces. Such interfaces may be wired or wireless, and may support any suitable communications protocols, such as for example Ethernet, FireWire, USB, Wi-Fi (e.g., a 802.11 protocol), Bluetooth (registered trademark), radio frequency systems, infrared, cellular protocols (CDMA, EDGE, HSDPA), WiMax, combination thereof, or any other suitable communications protocol.

In some embodiments, electronic device 100 may include other components not depicted in FIG. 1. For example, electronic device 100 may include a user input mechanism, a display, or any other suitable component. The user input mechanism can take a variety of forms, such as a button, a keypad, a dial, a click wheel, a display screen, a touch screen, or a multi-touch screen. The display may include any suitable screen or projection system for providing a display visible to the user. For example, the display may include a screen (e.g., an LCD screen) that is incorporated in electronic device 100. As another example, the display may include a movable display or a projecting system for providing a display of content on a surface remote from electronic device 100 (e.g., a video projector). The display may be operative to display content under the direction of control circuitry 130.

Figure 2:
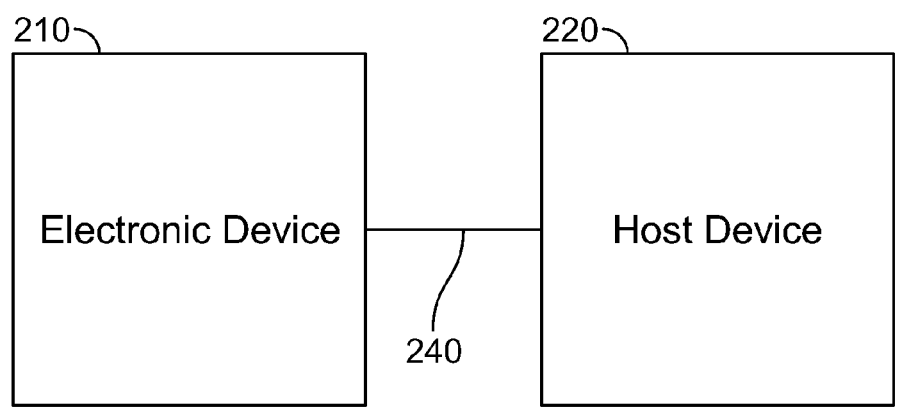
FIG. 2 is a simplified block diagram of an electronic device in communication with a host device in accordance with one embodiment of the invention.

FIG. 2 is a simplified block diagram of an electronic device in communication with a host device in accordance with one embodiment of the invention. Communications link 240 may connect electronic device 210 to host device 220. Communications link 240 may connect electronic device 210 and host device 220 using any suitable type of communications link (e.g., wired, wireless or both) and may support any suitable communications protocol. For example, communications link 240 may support Ethernet, FireWire, USB, Wi-Fi (e.g., a 802.11 protocol), Bluetooth (registered trademark), radio frequency systems, infrared, cellular protocols (CDMA, EDGE, HSDPA), WiMax, or any other suitable communications protocol.

Electronic device 210 may include some or all of the features of electronic device 100, described in FIG. 1. Host device 220, which may include any suitable component, including for example control circuitry, communications circuitry, and a storage component, may be any type of electronic device operable to connect with electronic device 210. For example, host device 220 may include a desktop computer, laptop computer, server, or any other suitable device. Host device 220 may store a copy of data stored on electronic device 210 (e.g., preference data, user settings, or personal information) as a back-up, for example for restoring electronic device 210 after a failure. In some embodiments, host device 220 may have access to and may download firmware (e.g., pushed updates), operating system files, and other data required for updating and maintaining electronic device 210. In some embodiments, electronic device 210 may store content (e.g., media and data files) received from or transferred to host device 220.

The electronic device file system, which may be mounted on a storage component (e.g., storage component 110, FIG. 1), may be used to store and organize the content on the electronic device. The file system may enable proper use of the electronic device as well as enable its connectivity to the host device by allowing the host device to mount the file system of the device. The file system may include a first block, sometimes referred to as the root block, providing information that enables the host device to interface with the file system of the electronic device (e.g., pointers to other blocks of the storage component). Using the values stored in the root block, the host device may mount the file system and recognize it as a storage component (e.g., as a USB storage component). When the electronic device's file system fails, however, the host device may not be able to recognize the electronic device when the host device and electronic device are connected, thereby preventing any substantive communication between the host device and the device.

The electronic device can determine that its file system has failed using any suitable approach. For example, the electronic device may detect an error mounting the file system by the file system code. As another example, the electronic device may timeout waiting for the file system to load. In response to determining that the file system has failed, the electronic device may set the value of its root block to a value associated with formatting the electronic device storage component. For example, the electronic device may set the root block values to zero. Alternatively, the electronic device may provide to the host device an artificial root block value (e.g., "spoofed" value) associated with formatting the electronic device storage component (e.g., a zero value).

When a user connects the device to a host device, the host device may determine that the received value of the root block is associated with a storage component that needs to be formatted. For example, the host device may detect an actual root block value associated with a storage component that needs to be formatted. As another example, the host device may detect a spoofed root block value associated with a storage component that needs to be formatted. By detecting the root block value that directs the host device to format the electronic device storage component, the host device may receive an instruction from the electronic device despite the file system failure.

Figure 3:
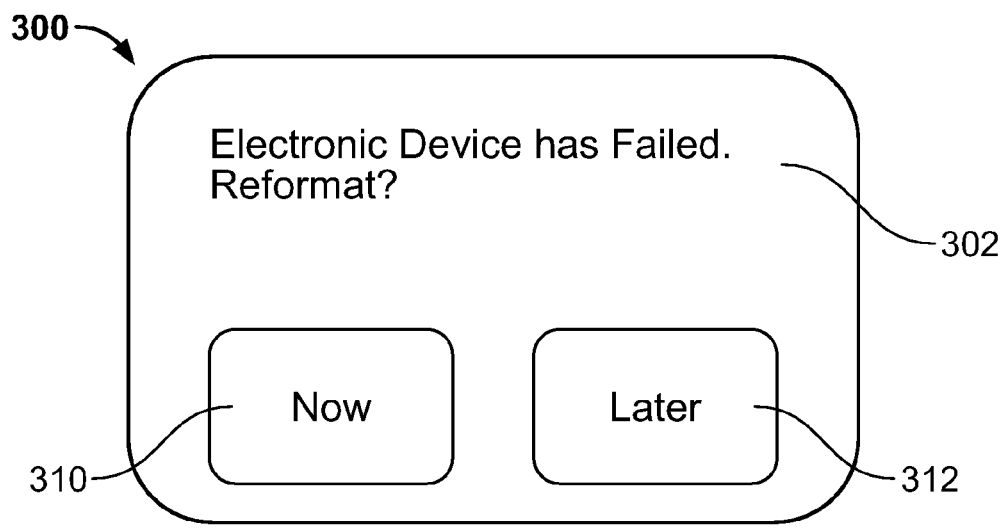
FIG. 3 is an illustrative display screen provided by a host device application after the electronic device has been reformatted in accordance with one embodiment of the invention.

FIG. 3 is an illustrative display screen displayed by a host device in accordance with one embodiment of the invention. A host device may display screen 300 in response to detecting that an electronic device root block value is associated with a storage component that needs to be formatted. Display screen 300 may include notification 302 indicating to the user that the electronic device has experienced a file system failure. In some embodiments, notification 302 may provide to the user information regarding the type or extent of the failure, the data lost, the data available, or any other suitable information. Notification 302 may prompt the user to take a particular action, such as formatting the electronic device, restoring content previously stored by the host device (e.g., as a backup), or any other suitable action. Display 300 may include selectable option 310 for directing the host device to take a prompted action (e.g., described in notification 302) and selectable option 312 for delaying or canceling the prompted action. Display 300 may be removed in response to a user selecting either option 310 or option 312.

Figure 4:
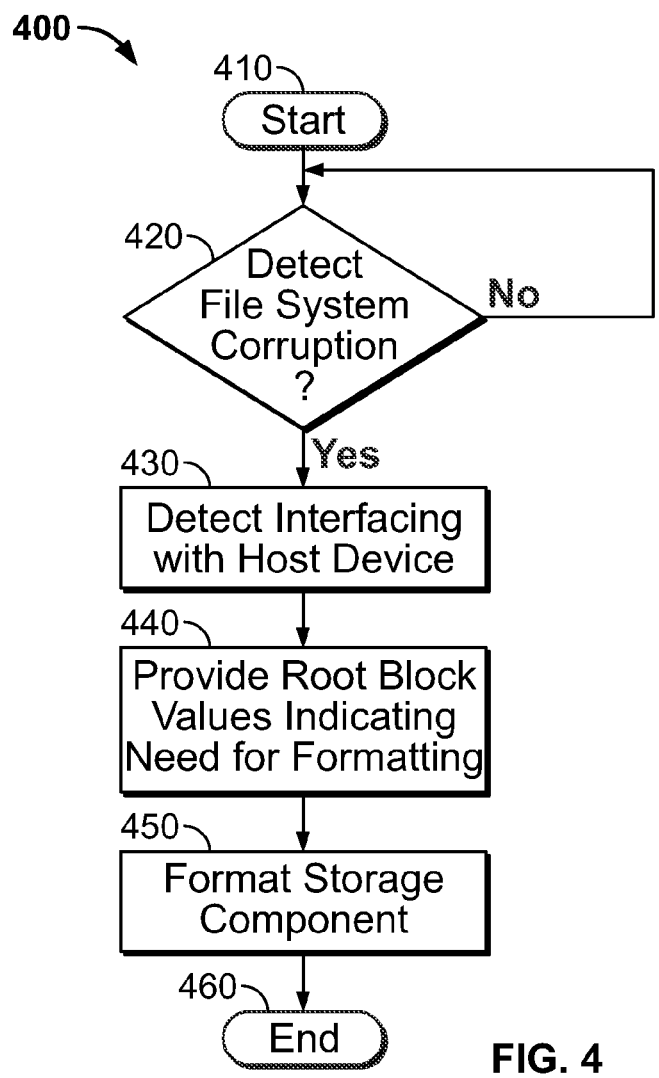
FIG. 4 is a flow chart of an illustrative process for determining how an electronic device may respond to file system corruption.

The following flow charts show illustrative processes for restoring an electronic device with a corrupt file system in accordance with different embodiments of the invention. FIG. 4 is a flow chart of an illustrative process for responding to a file system corruption in accordance with one embodiment of the invention. Process 400 may begin at step 410. At step 420, the electronic device may determine whether its file system has failed. For example, the electronic device may determine whether it is able to mount its file system. As another example, the electronic device may timeout waiting for the file system to load. If the electronic device determines that its file system has not failed, process 400 may return to step 410 and continue to check for file system failure. If, at step 420, the electronic device instead detects a file system failure, process 400 may move to step 430.

At step 430, the device may detect that it is interfacing with a host device. For example, the electronic device may detect a component from the host device. At step 440, the electronic device may provide to the host device root block values indicating a need for formatting. For example, the device may set its root block to a value associated with formatting a storage component, thus making the device appear to be a new device. As another example, the electronic device may "spoof" a root block value associated with formatting a storage component in response to detecting that the host device requested the information. At step 450, the storage component of the electronic device may be formatted, thereby replacing the corrupt file system and creating an operative file system. Process 400 may then end at step 460.

Figure 5:
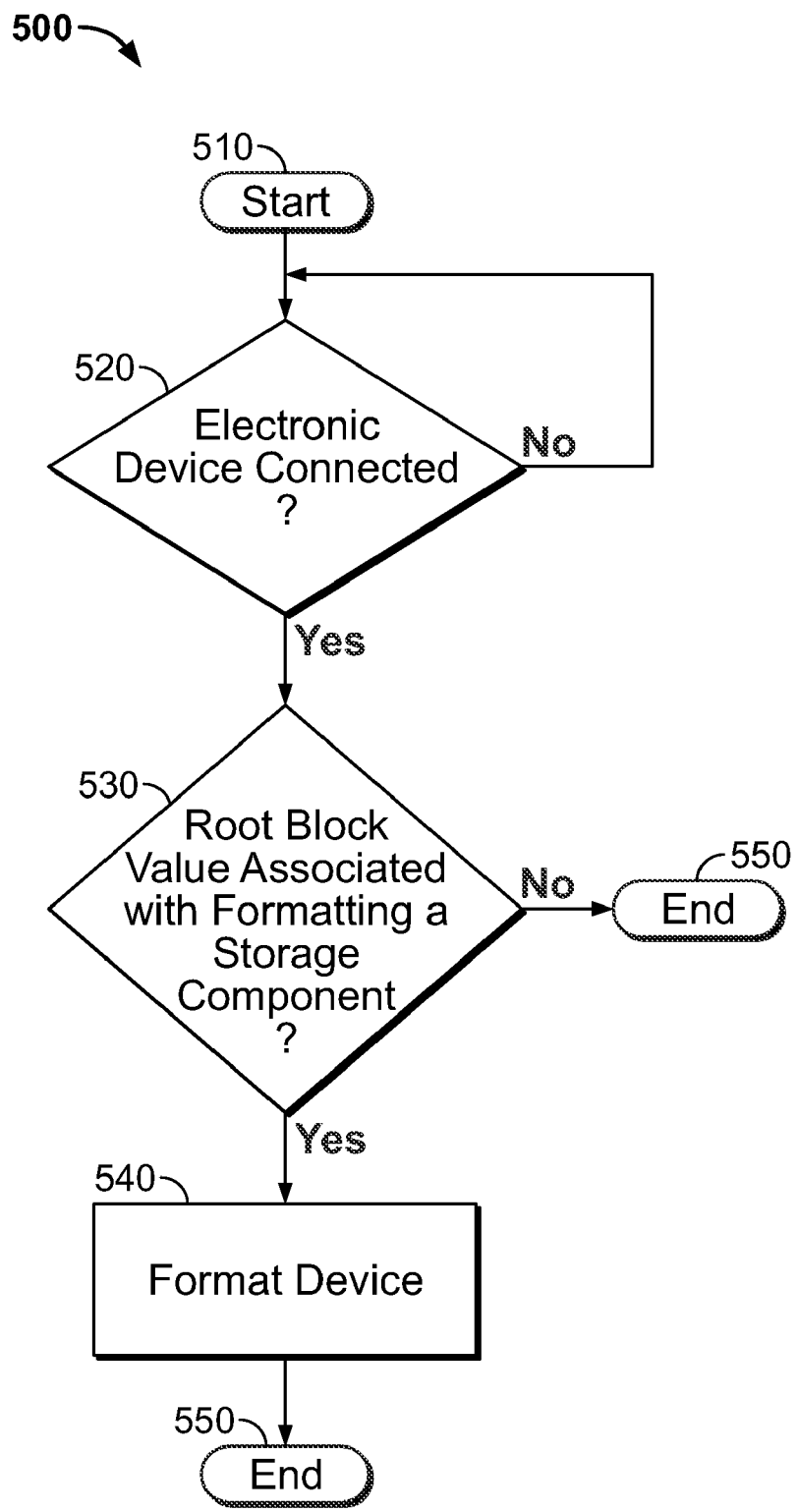
FIG. 5 is a flow chart of an illustrative process for reformatting an electronic device using a host device in accordance with one embodiment of the invention.

FIG. 5 is a flow chart of an illustrative process for reformatting an electronic device using a host device in accordance with one embodiment of the invention. Process 500 may begin at step 510. At step 520, the host device may determine whether an electronic device is connected to the host device. For example, the host device may determine whether a signal associated with an electronic device is received. If the host device does not detect an electronic device, process 500 may return to step 520 and continue to determine whether an electronic device is connected to the host device. If, at step 520, the host device instead determines that an electronic device is connected to the host device, process 500 may move to step 530.

At step 530, the host device may determine whether a value associated with formatting a storage component of the electronic device is detected. For example, the host device may detect a zero root block value. If the host device determines that a value associated with formatting a storage component of the electronic device is not detected, process 500 may end at step 550. If, at step 530, the host device instead determines that a value associated with formatting a storage component of the electronic device is detected, process 500 may move to step 540. At step 540, the host device may format the storage component of the electronic device, thereby creating a new file system that is not corrupted. The host device may use the newly created file system to recognize and mount the storage component of the electronic device. Once the storage component of the electronic device has been formatted, process 500 may end at step 550.

The above described embodiments of the invention are presented for the purposes of illustration and not of limitation, and the present invention is limited only by the claims which follow.

What is claimed is:

1. A method, implemented in a portable electronic device, comprising:
   determining that a file system of the electronic device is corrupt; and
   setting a root block value transmitted to a host device to a value indicating that a storage component of the electronic device requires formatting in response to determining.

2. The method of claim 1, further comprising:
   formatting the storage component;
   installing a new file system on the storage component; and
   setting the root block value to a value indicating that the storage component is formatted.

3. The method of claim 2, further comprising:
   receiving content from an external source; and
   storing the received content on the formatted storage component.

4. The method of claim 1, wherein determining further comprises:
   attempting to mount the file system; and
   failing to mount the file system.

5. The method of claim 4, wherein failing further comprises failing to mount the file system within the time period defined by a timeout.

6. The method of claim 4, wherein failing further comprises failing to mount the file system due to an error in the file system code.

7. The method of claim 1, wherein setting further comprises setting the value of the root block in the storage component to a value indicating that a storage component of the electronic device requires formatting.

8. The method of claim 1, wherein setting further comprises:
   detecting that the host device is coupled to the electronic device;
   receiving an attempt to read the value of the root block; and
   providing the set value to the host device 2 in response to receiving.

9. An electronic device comprising a processor and a storage component, the processor operative to:
   determine that a file system stored on the storage component is corrupt;
   detect that the electronic device is coupled to a host device; and
   provide a value for a root block of the storage component to the host device, wherein the value is associated with the storage component requiring formatting in response to detecting.

10. The electronic device of claim 9, wherein the processor is further operative to:
    receive a request from the host device to access the root block; and
    provide in response to receiving.

11. The electronic device of claim 9, wherein the processor is further operative to:
    change the values of the root block to values associated with the storage component requiring formatting.

12. The electronic device of claim 11, wherein the processor is further operative to change the values of the root block to zeroes.

13. The electronic device of claim 9, wherein the processor is further operative to:
    provide a root block value associated with the storage component requiring formatting independent of the actual value of the root block.

14. The electronic device of claim 9, wherein the processor is further operative to:
    receive a new file system from the host device; and
    install the new file system.

15. The electronic device of claim 14, wherein the processor is further operative to set the root block value to a value indicating that the storage component is formatted.

16. The electronic device of claim 15, wherein the processor is further operative to:
    receive content from an external source; and
    store the received content on the formatted storage component.

17. Computer-readable media for enabling an electronic device to be formatted, comprising computer program logic recorded thereon for:
    determining that a file system of the electronic device is corrupt; and
    setting a root block value of the electronic device to a value indicating that a storage component of the electronic device requires formatting in response to determining.

18. The computer-readable media of claim 17, further comprising additional computer program logic recorded thereon for:
    formatting the storage component;
    installing a new file system on the storage component; and
    setting the root block value to a value indicating that the storage component is formatted.

* * * * *

UNITED STATES PATENT AND TRADEMARK OFFICE
CERTIFICATE OF CORRECTION

| | | |
|---|---|---|
| PATENT NO. | : 7,849,365 B2 | Page 1 of 1 |
| APPLICATION NO. | : 12/183009 | |
| DATED | : December 7, 2010 | |
| INVENTOR(S) | : Kenneth Herman | |

It is certified that error appears in the above-identified patent and that said Letters Patent is hereby corrected as shown below:

In column 2, line 26, delete "iphone" and insert -- iPhone --, therefor.

Signed and Sealed this
Twenty-fifth Day of October, 2011

David J. Kappos
*Director of the United States Patent and Trademark Office*